April 24, 1951 C. W. HEINLE ET AL 2,549,808
APPARATUS FOR PRODUCING FRANGIBLE SEAL CONTAINER PARTS
Filed Aug. 5, 1947 2 Sheets-Sheet 1

SOURCE OF GAS SUPPLY

INVENTORS
Carl W. Heinle
Ronald E. J. Nordquist
BY Ivan D. Thornburgh
Charles H. Erne
ATTORNEYS April 24, 1951  C. W. HEINLE ET AL  2,549,808
APPARATUS FOR PRODUCING FRANGIBLE SEAL CONTAINER PARTS
Filed Aug. 5, 1947  2 Sheets-Sheet 2
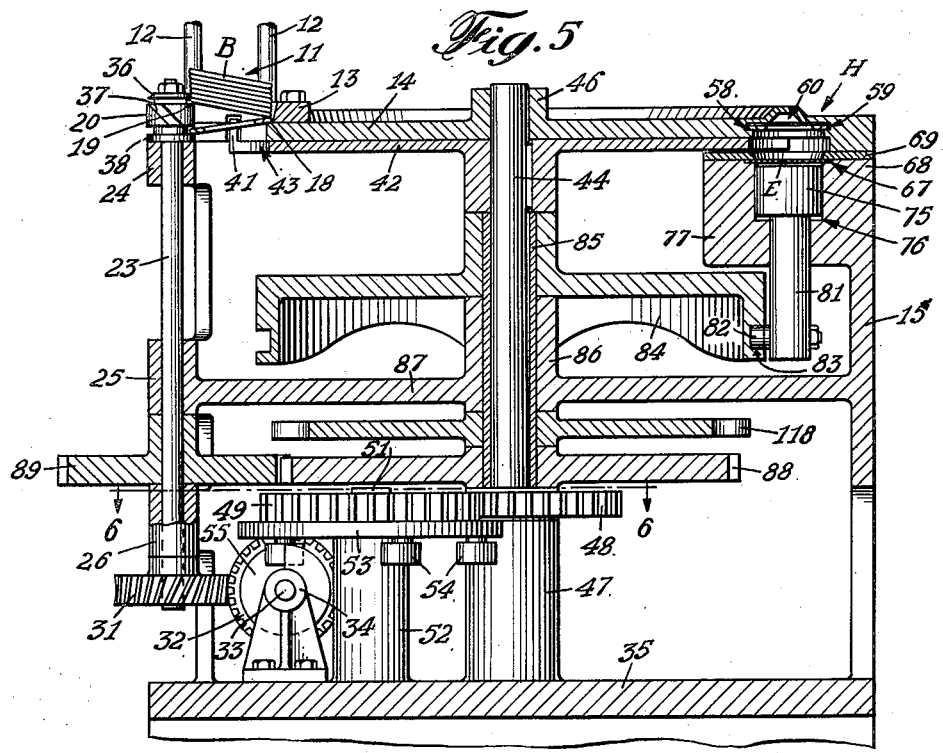
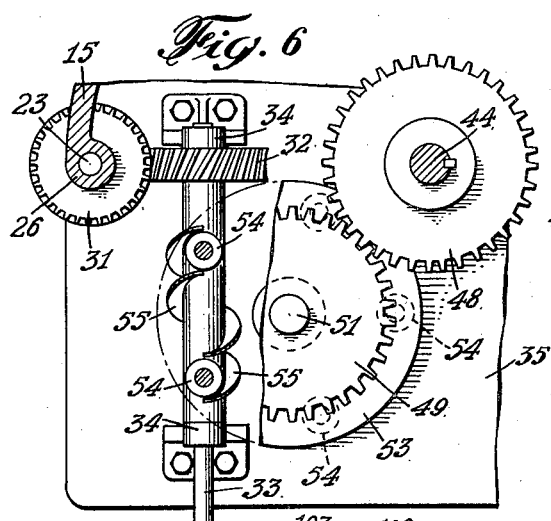
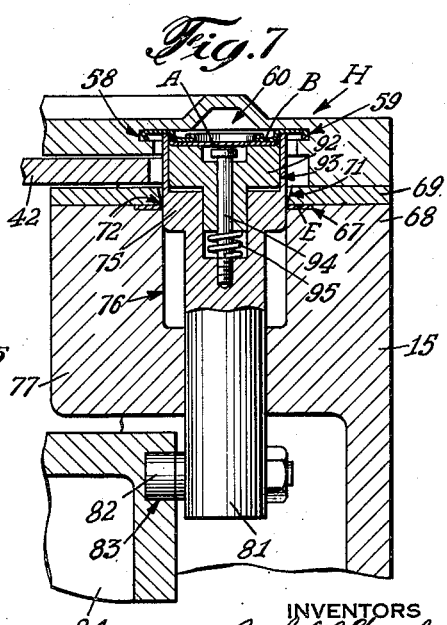
INVENTORS
Carl W. Heinle
Ronald E. Nordquist
BY Ivan D. Thornburgh
Charles H. Erne
ATTORNEYS Patented Apr. 24, 1951

2,549,808

UNITED STATES PATENT OFFICE 2,549,808

APPARATUS FOR PRODUCING FRANGIBLE SEAL CONTAINER PARTS

Carl W. Heinle, East Orange, and Ronald E. J. Nordquist, Maplewood, N. J., assignors to American Can Company, New York, N. Y., a corporation of New Jersey Application August 5, 1947, Serial No. 766,344

2 Claims. (Cl. 154—1.5)

The present invention relates to a method of and apparatus for producing a composite or multiple member container or can structure including a frangible sealing member and has particular reference to attaching the frangible sealing member to another member of the structure so that the frangible sealing member and the structure it is attached to may be handled as a unitary structure.

In containers or cans, known in the can making industry as frangible seal cans, a sealing disc of frangible material is provided to cover the mouth or other opening in the container and is held in place in any suitable manner, usually by clamping the peripheral edge portion of the disc between a ring member and a bead on the can body member or by incorporating the edge portion of the disc in a seam uniting the ring with the body member. The sealing disc may be made from any pliable and easily fracturable material, such as "Cellophane," glassine, foil of various kinds, and various other types of fibrous and nonfibrous materials.

The sealing disc constitutes a temporary seal for the container, to be broken by the consumer, and is usually protected by a reclosure cover such as a slip cover, friction plug, screw thread cover, or the like. The sealing disc is made, usually from thin material of a mere few thousandths of an inch in thickness and because of this thinness it inherently possesses flexible characteristics which creates considerable difficulty in handling it in automatic machines designed to assemble the disc and the can parts to produce a complete container.

The instant invention contemplates overcoming this difficulty by the provision of a method of and apparatus for readily attaching a frangible sealing disc to one of the can parts so that the disc and the part may be handled as a unitary structure.

An object of the invention is the provision of a method of and apparatus for producing a composite or multiple member container structure including a frangible sealing member wherein the frangible sealing member to be incorporated in a container is secured to a member of the container to provide a unitary structure of frangible seal and container part, which structure is readily handled in an automatic machine for incorporation into a finished container.

Another object is the provision of such a method of and apparatus for producing a multiple member frangible sealing structure for a container including a frangible sealing member wherein one of the members has at least a portion thereof thermoplastically fusible and is utilized for sealing the members of the structure together by heating at least one of the members to cause adherence of the frangible sealing member to another of the members for economically and quickly bonding the members together into a unitary structure to facilitate further handling of the frangible sealing member.

Numerous other objects and advantages of the invention will be apparent as it is better understood from the following description, which, taken in connection with the accompanying drawings, discloses a preferred embodiment thereof.

Referring to the drawings:

Fig. 5 is a sectional view taken substantially along the broken line 5—5 in Fig. 1, with parts broken away;

Fig. 6 is a horizontal section taken substantially along the line 6—6 in Fig. 5, with parts broken away;

Fig. 7 is an enlarged sectional detail of parts shown at the right in Fig. 5, with parts broken away; and Fig. 8 is an elevational detail of parts shown at the left in Fig. 2, with parts broken away.

Figure 4:
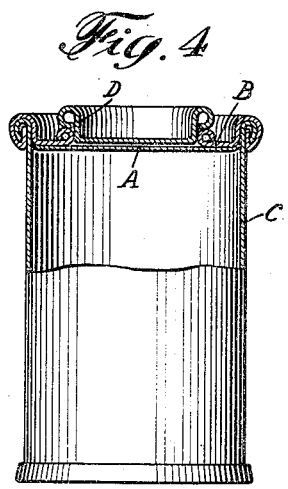
Fig. 4 is a part side elevation part sectional view of a typical container sealed in accordance with the instant method and apparatus invention.

As a preferred embodiment of the instant invention the drawings illustrate steps of a method of and principal parts of an apparatus for securing a frangible sealing disc or member A (Figs. 4 and 7) to a metallic ring or similar container member B constituting a composite or multiple member container structure to be subsequently secured to a container C and adapted to be closed with a friction plug or other suitable reclosure element D.

In accordance with the steps of the instant method invention, the frangible sealing disc A is cut from a strip or web E (Fig. 1) of frangible sealing material having at least a portion thereof thermoplastically fusible. As an example of such a strip, the drawings show a web of thin paper coated on one face with a film of dried or solidified thermoplastic adhesive, although the invention is equally well adapted to other kinds of web material and other securing agents. In some cases the web may be impregnated with a securing agent or the web itself may be of a plastic nature which will adhere to the ring under heat treatment.

As another step in the method, one of the members of the multiple member container structure, in this case the ring B, is heated in any suitable manner, to a temperature sufficient to melt or soften the thermoplastically fusible portion of the disc A, in this case the adhesive on the disc. The heated ring and the disc are then brought together under pressure with the adhesive coated face of the disc in engagement with the ring.

The heat in the ring immediately melts or softens the adhesive coating on the disc and causes it to adhere to the ring. Upon cooling the adhesive provides a bond between the disc and the ring and thereby unites them into a unitary structure which may be readily handled for subsequent incorporation into a container.

In most cases the ring and the frangible sealing disc secured thereto will be immediately assembled with a container body and secured in place to provide a finished container. However if desired, the ring and its bonded frangible sealing disc may be shipped or stored as a container part to be subsequently assembled with a container at a place other than that at which the structure was produced.

One form of apparatus for carrying out the above described steps of the instant method is illustrated in the drawings. In this apparatus the rings B are fed along a curved path of travel through a heating station G (Figs. 1 and 3) and thence toward the strip E of frangible sealing material where the discs A are cut from the strip and immediately secured to the rings.

A supply of the rings B are retained in stacked formation in a magazine 11 (Figs. 1 and 5) defined by a plurality of vertically disposed guide bars 12 secured at their lower ends in a magazine base ring 13 bolted onto a stationary top plate 14 secured to a frame 15 which may constitute a part of the main frame of a more elaborate machine to which the instant mechanism is attached.

The rings B are fed individually from the bottom of the stack of rings in the magazine 11 by a conventional ring or end closure feeding mechanism of the type disclosed in United States Patent 2,172,402 issued September 12, 1939, to R. E. J. Nordquist on Can Treating Machine and Feed Control Therefor. In such a feeding mechanism, the lowermost ring B in the stack is disposed in an angular position as shown in Fig. 5 with its inner edge resting on a shoulder 18 of the top plate 14 and its outer edge resting on ledge 19 of a rotatable separator screw 20 disposed adjacent the lower end of the magazine.

The separator screw 20 is mounted on the upper end of a vertical shaft 23 carried in a series of three spaced bearings 24, 25, 26 formed on the frame 15. The separator screw is continuously rotated by a helical gear 31 mounted on the lower end of the shaft 23. This gear meshes with and is driven by a helical gear 32 (see also Fig. 6) carried on a horizontally disposed main driving shaft 33 journaled in a pair of spaced bearing brackets 34 bolted to a horizontal web 35 of the frame. The shaft is continuously rotated in any suitable manner.

Upon each rotation of the separator screw 20, a separator knife 36 secured to the top of the screw in spaced relation to its support ledge 19, cuts in between the lowermost ring B in the stack and the ring next above and supports the stack while the lowermost ring falls into a spiral groove 37 formed in the screw. Rotation of the screw carries the outer edge of the lowermost ring downwardly along this spiral groove until the ring is in the position shown in Fig. 5. This action separates the lowermost ring from the other rings in the stack and leaves it in an inclined position with its inner edge still supported on the shoulder 18 of the top plate and its outer edge supported on a collar 38 formed on the bottom of the separator screw 20.

The separation of a ring B from its stack as explained above, positions it in the path of travel of a feed finger 41 (Figs. 1 and 5) formed on a feed turret 42 which is rotated intermittently in time with the separation of the rings from the stack. This turret is formed with a plurality of pockets 43 disposed adjacent its outer periphery. There is one feed finger 41 for each pocket.

The turret 42 is disposed immediately beneath the top plate 14 and is mounted on and rotates with an intermittently actuated vertical turret shaft 44 carried in bearings 46, 47 formed respectively on the top plate 14 and the frame web 35. The shaft is intermittently rotated by a gear 48 (see also Fig. 6) which is carried on the shaft and which meshes with an indexing gear 49 mounted on a vertical shaft 51 carried in a bearing 52 on the frame web 35. The gear is formed integrally with a disc 53 which carries a plurality of indexing rollers 54, one for each turret pocket 43, and these rollers are individually engaged in succession by an interrupted or Geneva cam 55 mounted on the main drive shaft 33.

Hence each time the drive shaft 33 makes one revolution, one of the indexing rollers 54 is engaged by the cam 55 and indexed or advanced through an arcuate path of travel and this partially rotates the indexing gear 49. This partial rotation of the indexing gear turns the turret 42 through a partial rotation in time with the separation of the rings B from their magazine as hereinbefore mentioned.

Upon each partial rotation of the turret 42, a feed finger 41 sweeps under the magazine 11 and engages behind a separated ring B and advances it along a curved path of travel adjacent the outer periphery of the turret while remaining in vertical alignment with its pocket 43. During this travel of the ring B, its inner and outer edges move along inner and outer guide grooves 58, 59 (Figs. 1, 3 and 5) formed in the top plate 14 and is thus retained under control during this movement. A clearance recess 60 is provided in the top plate for the free movement of the feed fingers 41.

Figure 1:
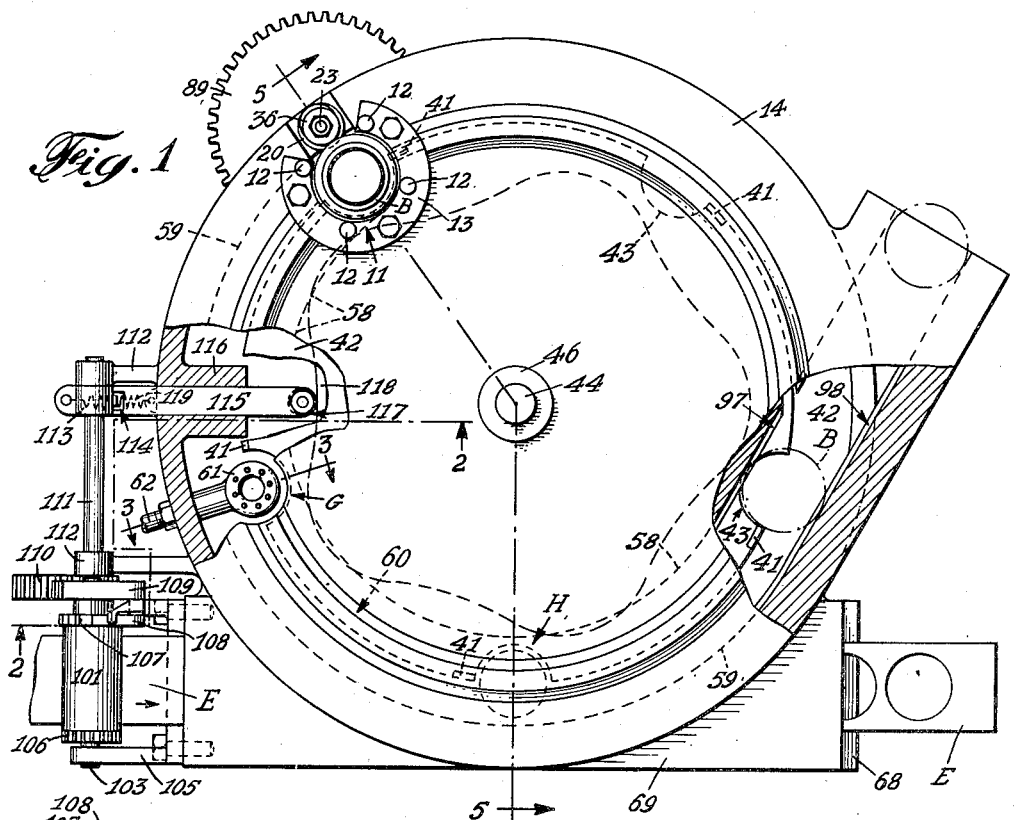
Figure 1 is a top plan view of an apparatus embodying the instant invention and utilized for carrying out the method steps thereof, with parts broken away and parts shown in section.
Figure 3:
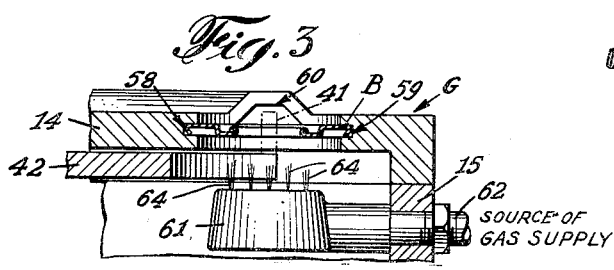
Fig. 3 is an enlarged sectional detail taken substantially along the line 3—3 of Fig. 1, with parts broken away.

Upon the completion of a partial rotation of the turret 42, the advancing ring B is first brought to rest at a heating station G (Figs. 1 and 3). At this station, the ring is disposed over an annular shaped heating element 61 which preferably is of the gas fired type but which may be electric or electronic or of any other suitable type. The heating element shown in the drawings is mounted on the inner end of a gas supply pipe 62 which extends through and is secured to a side web of the main frame 15 and which leads from any suitable source of supply of gas. As the ring momentarily remains stationary at this station G, between partial rotations of the turret, a plurality of small gas flames 64 issuing from the heating element 61 impinge against the ring and thereby heat it to a desired temperature for the reception of a sealing disc A.

Upon the next partial rotation of the turret 42, the heated ring B is carried by its feed finger 41 to a disc cutting and assembling station H (Figs. 1, 5 and 7). While the ring remains momentarily stationary at this station a disc A is cut from the adhesive coated web or strip E of material and is immediately pressed into position against the heated ring for attaching the disc to the ring as will be hereinafter more fully explained.

The web E of material is disposed in a horizontal position with its adhesive coated side facing up, in a shallow runway 67 (Figs. 5 and 7) formed in a table 68 of the main frame 15. The runway is slightly wider than the width of the web and slightly deeper than the thickness of the web to allow for the free passage of the web along the runway. A die plate 69, secured to the top of the table and interposed between the table and the top plate 14 retains the web in place in its runway.

At the cutting and assembling station H, the die plate 69 is formed with a circular die opening 71 (Fig. 7) surrounded by a sharp cutting edge 72 constituting a stationary die member for cutting a disc A from the web E. A movable die member is provided for cooperation with the stationary die member and includes a vertically reciprocable punch 75, located below the web runway 67 in a recess 76 formed in a boss 77 extended inwardly from the main frame 15. The punch is concentric with the cutting edge 72 of the stationary die member and is in vertical alignment therewith.

The lower end of the punch 75 is formed with a stem 81 which extends down below the boss 77 and which carries a cam roller 82. The cam roller operates in a cam groove 83 of a barrel cam 84 mounted on a sleeve 85 surrounding the vertical shaft 44 and journaled in a bearing 86 formed on a horizontal web 87 of the frame 15. The sleeve is continuously rotated in time with the other moving parts of the apparatus by a gear 88 (Fig. 5) which is secured to the lower end of the sleeve and which meshes with and is driven by a gear 89 carried on the separator screw shaft 23.

Hence as the cam 84 continuously rotates, it raises and lowers the punch 75 in time with the rest periods of the turret 42 between its partial rotations. On the up stroke of the punch it presses the web E against the cut edge 72 of the die plate 69 and cuts a disc A therefrom and carries the cut out disc upwardly into engagement with the heated ring B located at the cutting and assembling station H.

In this elevated position, the disc A is firmly pressed against the heated ring by a pressure pad 92 (Fig. 7) which is located within a recess 93 formed in the punch 75. This pressure pad is held in place within the punch recess by a long bolt 94 which extends down through the pad and is threadedly secured in the stem 81 of the punch. A compression spring 95 interposed between the pad and the punch maintains the pad under a desired spring pressure. The upper face of the pad is shaped to fit the contour or profile of the ring B and thus as the punch 75 reaches the upper limit of its up stroke the pressure pad compresses the disc A against the ring and shapes it to the profile of the ring. The spring 95 takes up any difference in stroke between the punch and the pad and thus keeps the pad and the disc pressed tightly against the ring. During this pressing action of the disc A against the ring B, the ring is backed up by the cover plate 14 as shown in Fig. 7.

With the disc A thus held against the heated ring B, the film of coating substance on the surface of the disc in engagement with the ring is heated and melted or softened by the ring and thereby spreads over the engaged surface of the ring and causes the disc to tightly adhere to the ring. Upon cooling this softened substance forms a tight bond between the ring and the disc.

As soon as the disc A has been attached to the ring B, the punch 75 and pressure pad 92 move down out of the die plate 69 to their original position and the ring with its attached sealing disc is discharged from the assembling station H and the web E is advanced for the cutting of another disc A for the next following ring. Discharge of the ring and its attached sealing disc is effected by the turret 42 upon its next following partial rotation which takes place as soon as the receding punch 75 is clear of the turret.

During this partial rotation of the turret 42, the ring B and its attached disc A are propelled as a unitary structure along discharge grooves 97, 98 (Fig. 1) which are continuations of the supporting grooves 58, 59 in the top plate 14. These discharge grooves 97, 98 in the top plate 14 extend outwardly at an angle to the outer edge of the turret 42 and direct the assembled ring B and disc A to any suitable place of deposit. The inner groove 97 is broken adjacent the edge of the turret to permit passage of the turret feeding finger 41 without interference.

Figure 2:
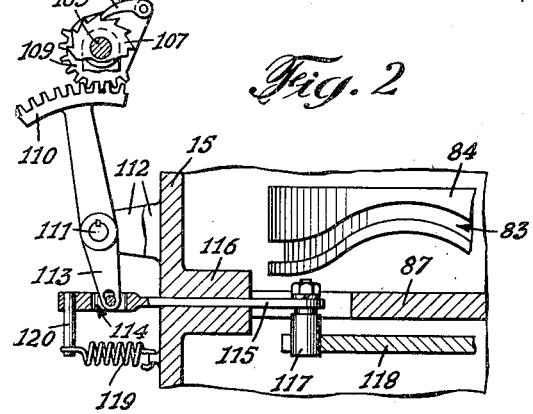
Fig. 2 is a sectional view taken substantially along the broken line 2—2 in Fig. 1, with parts broken away.

Advancement of the strip E into the cutting and assembling station H may be effected in any suitable manner in time with the operation of the punch 75. By way of example, the drawings show a pair of intermittently operated feed rollers 101, 102 (Figs. 1, 2 and 8) disposed on opposite sides of the strip for this purpose. The rolls are mounted on shafts 103, 104 carried in suitable bearings formed in a bracket 105 secured to the frame 15.

The feed rollers 101, 102 are rotated in unison by a pair of meshing gears 106 mounted on the shafts 103, 104. The upper roll is driven by a ratchet wheel 107 mounted on the shaft 103 and by a pawl 108 carried on a segment gear 109 mounted on the shaft 103 adjacent the ratchet wheel 107. The segment gear 109 is intermittently rocked through a feeding stroke and thence through a return stroke by a segment gear 110 mounted on a rocker shaft 111 carried in lugs 112 which extend out from the frame 15.

The shaft 111 is rocked in time with the other moving parts of the apparatus by a cam arm 113 (Figs. 1 and 2) which extends down into a recess 114 formed in a horizontal slide bar 115. The lower end of the arm is pivotally connected to the slide bar. The slide bar is reciprocably carried in a bearing 116 formed on the frame 15. On its inner end the slide bar carries a cam roller 117 which operates against an edge cam 118 mounted on the continuously rotating sleeve 85 (Fig. 5) surrounding the turret shaft 44. A spring 119 interposed between the frame 15 and a pin 120 carried in the outer end of the slide bar 115 keeps the roller 117 in engagement with its cam 118. This is a conventional intermittent feeding device such as disclosed in United States Patent 1,846,319 issued February 23, 1932, to J. Dister on Apparatus for Preparing Drumhead Can Bodies.

While in the preferred embodiment of the invention the frangible sealing material is at least partially coated with thermoplastic adhesive, it should be understood that as an alternative at least a portion of the under surface of the ring B may be coated with thermoplastic adhesive, or both the frangible sealing material and the ring may be so coated. In the event that the adhesive is applied to the ring, the ring when heated at the station G will transfer some of its heat to the adhesive and thereby soften the adhesive, and the disc and the ring bearing the softened adhesive will be pressed together at station H, thus attaching the disc to the ring.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. An apparatus for producing a multiple container structure including a frangible sealing element, comprising in combination a rotatable turret for carrying a container member through a plurality of working stations, heating means at a heating station for heating said member, means for passing a web of frangible sealing material having at least a portion thereof thermoplastically fusible through a cutting station located in the path of said rotatable turret, die means at said cutting station for cutting a frangible sealing disc from said web, means for rotating said turret to position a container member at said heating station and to position a heated container member in alignment with said die means at said cutting station, and means for operating said die means for cutting said disc and for shifting the cut disc into engagement with said heated container member and for holding it during fusion of the thermoplastic portion of the disc to effect adherence of the disc to said container member thereby uniting them into a unitary structure.

2. An apparatus for producing a unit frangible sealing element and a closure member, comprising in combination a magazine for retaining a stack of closure members, a rotatable turret having movement below said magazine for conveying a closure member through a plurality of working stations, separator means adjacent said magazine for separating a closure member from said magazine and for delivering it to a pocket of the turret, heating means positioned below said turret at a heating station for heating said member, feeding means for passing a web of frangible sealing material having at least a portion thereof thermoplastically fusible over said turret and through a cutting station, die means located below said turret at said cutting station for cutting a frangible sealing disc from said web, means for rotating said turret to position a separated container member at said heating station and to position a heated closure member over and in alignment with said die means at said cutting station, and means for operating said die means to first cut said disc and then to lift the cut disc into engagement with said heated closure member, said die operating means thereupon holding the disc against said closure member during fusion of the thermoplastic portion of the disc to effect adherence of the sealing disc on said closure member thereby uniting them into a unitary structure.

CARL W. HEINLE.
RONALD E. J. NORDQUIST.

REFERENCES CITED

The following references are of record in the file of this patent:

UNITED STATES PATENTS

| Number | Name | Date |
|---|---|---|
| 1,080,015 | Lawson | Dec. 2, 1913 |
| 1,134,031 | Clark | Mar. 30, 1915 |
| 1,921,808 | Cohn | Aug. 8, 1933 |
| 2,367,250 | Warth et al. | Jan. 16, 1945 |